Figure 3:
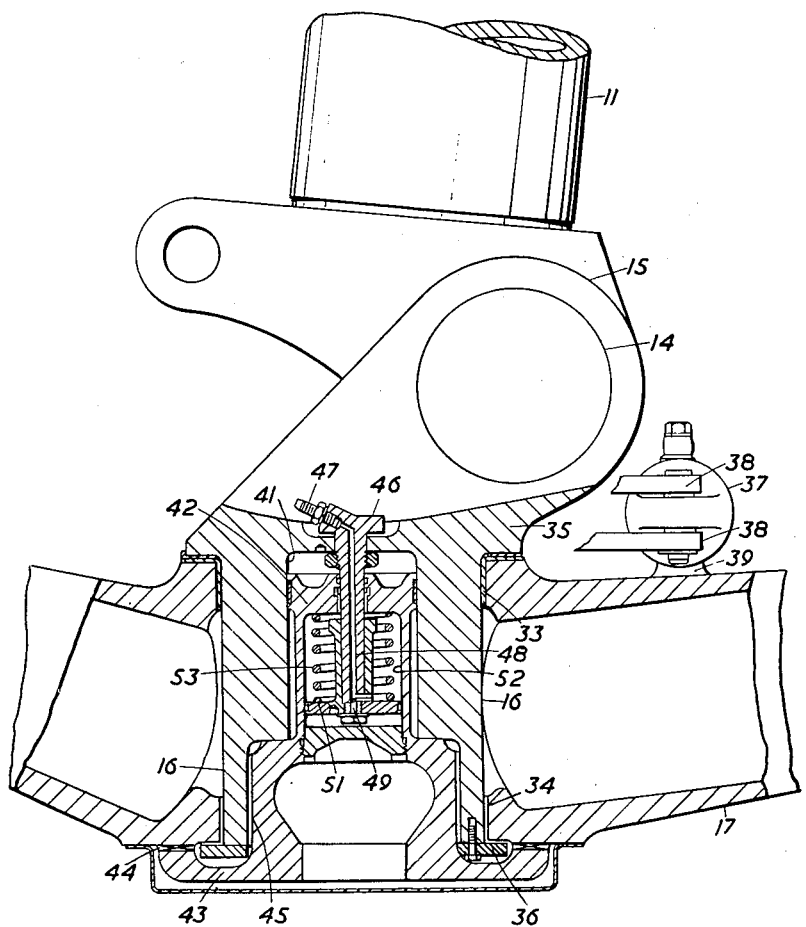

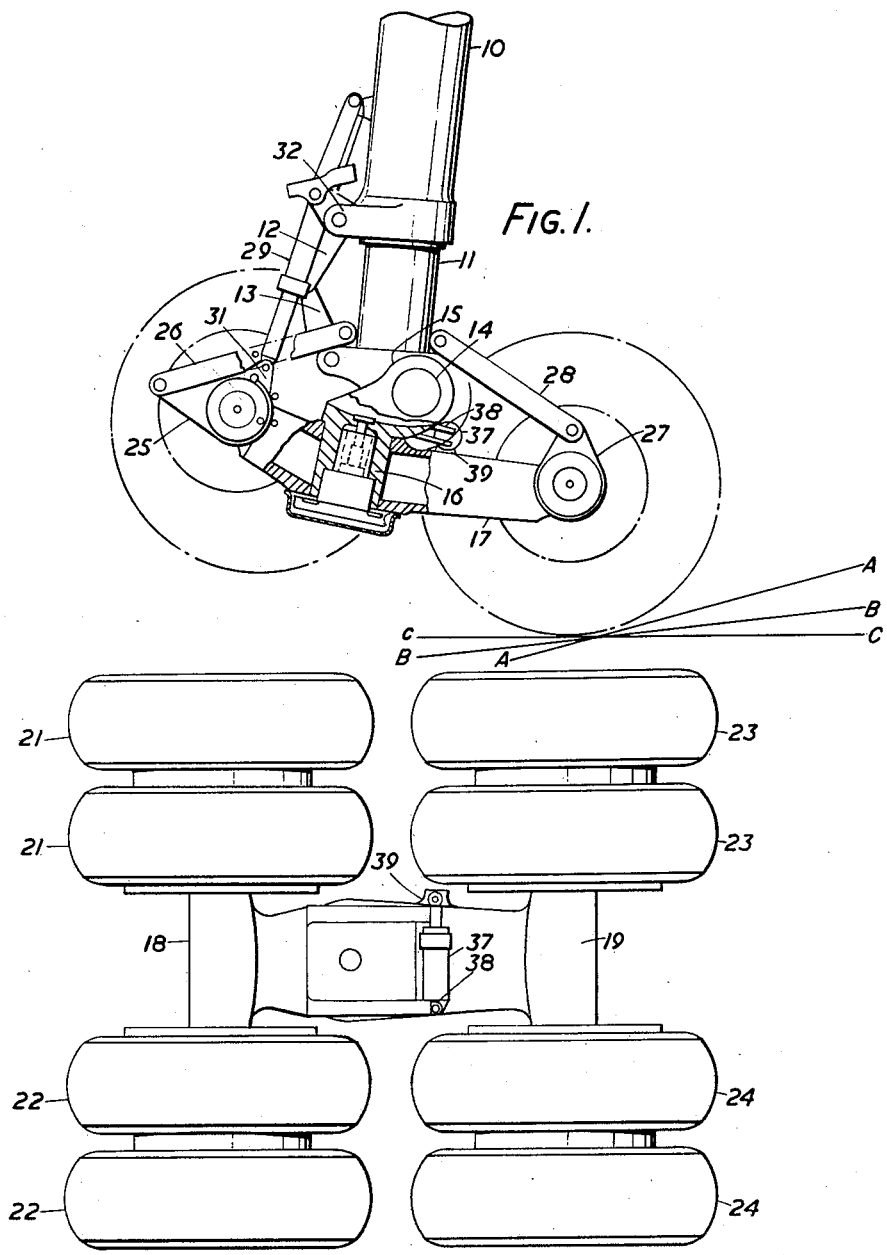

United States Patent Office

3,091,416
Patented May 28, 1963

3,091,416
BOGIE UNDERCARRIAGES FOR AIRCRAFT
Richard N. Knights, Hucclecote, and Angus R. Pitt, Arthur A. J. Willitt, and Sidney W. H. Wood, Cheltenham, England, assignors to Dowty Rotol Limited, Cheltenham, England, a British company
Filed Feb. 23, 1961, Ser. No. 91,223
Claims priority, application Great Britain Feb. 29, 1960
7 Claims. (Cl. 244—50)

This invention relates to a main undercarriage component for aircraft of the kind comprising multiple wheel assemblies mounted on transverse axles which are arranged in tandem on a bogie pivoted to a leg member about a transverse axis.

To enable an aircraft to make a crosswind take-off or landing it is desirable to provide some degree of controllable steering for the main undercarriage components so that the aircraft can be turned into the wind while the wheels are aligned along the runway. In providing such steering, the mounting of the wheels is complicated by the fact that the steering axis, which is usually that of the leg member, will not generally be perpendicular to the ground either when the aircraft is in a nose-up attitude just after touch down, or when it is running on the ground with all wheels down. If under this circumstance the bogie is steered out of the longitudinal direction of the aircraft each wheel axle will become inclined to the horizontal so that a wheel at one end of each axle will bear more heavily on the ground than a wheel at the other end.

This condition can put an undesirable load on the wheels on one side of the bogie, and on the structure of the leg, when a substantial part at least of the aircraft weight is being supported by the main undercarriage.

According to the present invention, a main undercarriage component for aircraft comprises a leg member adapted at its upper end for mounting on an aircraft, a bogie having multiple wheel assemblies mounted on transverse rotational axes spaced one behind the other, a pivotal mounting by which the bogie is attached to the leg member, the pivotal mounting providing for turning movement of the bogie about an axis which is transverse to the longitudinal direction of the aircraft and about an axis which is perpendicular to the plane containing the axes of the wheel assemblies, and a steering motor interposed between the pivotal mounting and the bogie for turning the bogie both ways from a longitudinal direction.

Thus regardless of the angle at which the axis of the leg intersects the ground, when all the wheels are on the ground the steering axis will be substantially perpendicular to the ground, so that the bogie can be turned by the steering motor either way from the longitudinal direction without unbalancing the distribution of load between the wheels on opposite sides of the bogie.

In the accompanying drawings,
FIGURE 1 shows one form of bogie undercarriage component to which the invention is applied;
FIGURE 2 is a plan view of the bogie assembly; and
FIGURE 3 is a side elevation on an enlarged scale showing parts of FIGURE 1 in section and in greater detail.

The undercarriage component comprises an upper leg part 10 only the lower portion of which is shown, but which is adapted for mounting on an aircraft, and a lower leg part 11 slidable therein. The two parts 10 and 11 of the leg member are interconnected by torque links 12 and 13 which prevent relative rotation. The lower end portion of the leg part 11 carries a transverse pivot 14 on which an intermediate member 15 is mounted and from which a king pin 16 extends downwardly. A rigid bogie frame 17 is mounted on the king pin 16 and at the front and rear is formed with mountings 18 and 19 respectively for front and rear axles. The axles are not seen, but as shown in FIGURE 2 the front axle carries right and left hand pairs of wheels 21 and 22, while the rear axle carries right and left hand pairs of wheels 23 and 24. The king pin 16 is nearer the front axle than to the rear axle so that the bogie can caster when free to turn on the king pin 16.

Each front pair of wheels has a brake torque plate 25 connected by a torque reaction link 26 to the lower leg part 11 and each rear pair of wheels has a torque reaction plate 27 connected by a torque reaction link 28 to the lower leg part 11. A telescopic tie rod 29 forms a link which is connected between a lug 31 on the front axle mounting and a lug 32 at the lower end of the upper leg part. The pivoted connections at the ends of the torque reaction links 26 and 28, and the telescopic tie rod 29 are provided in known manner by universal pivoted joints which permit angular movement of the rigid bogie frame 17 about the axis of the king pin 16 throughout the steering range necessary for cross-wind landing or take-off. As shown in FIGURE 1, the link 29 is fully extended and acts to maintain the rear pairs of wheels 23 and 24 lower than the front pair of wheels 21 and 22 when the aircraft is airborne, and the lower leg part 11 fully extended from the upper leg part 10. The function of the link 29 prior to landing and during landing is described in U.S. Patent No. 2,731,218 to Patrick Bonar.

The mechanism shown in FIGURE 3 will now be described in greater detail. The king pin 16 extends through combined thrust and journal bearing liners 33 and 34 fixed in the bogie 17, a shoulder 35 of the intermediate member 15 abutting against the bearing 33 and a retaining plate 36 abutting against the bearing 34. The bogie frame 17 can be turned on the king pin 16 by a double acting hydraulic jack 37 which is anchored at one end in lugs 38 attached to the intermediate member and anchored at the other end in a lug 39 upstanding from the bogie frame 17.

Mechanism including a clutch for angularly locking the bogie frame 17 with respect to the king pin 16 is mounted in the king pin and comprises a cylinder bore 41, a plunger 42 mounted in the cylinder bore, a flange 43 upon a lower extension of the plunger 42, and co-operating dog teeth 44 formed concentrically about the axis of the king pin 16 both an the flange 43 and on the lower surface of the bogie frame 17. These dog teeth are formed so that they can lock the bogie frame 17 to the king pin 16 in a number of selected positions. For this purpose, the lower extension of the plunger 42 is prevented from turning in the king pin 16 by means of co-operating splines 45. A stem 46 mounted centrally in the king pin 16 has two fluid supply connectors, of which only one numbered 47 is seen in FIGURE 3, leading to passages 48 and 49 in the stem which terminate at opposite sides of an inner piston 51. The inner piston 51 is slidably mounted in a hydraulic cylinder 52 formed in the plunger 42 and a compression spring 53 seated on the piston 51 acts upwardly on the plunger 42. If fluid pressure is admitted to the passage 49 and the underside of the inner piston 51 while the upper side is exhausted through the passage 48, the plunger 42 will be lowered against spring load to disengage the dog teeth 44 so that the bogie frame 33 is free to turn on the king pin 16. If instead fluid pressure is admitted through the passage 48 to the upper side of the inner piston 51 while the lower side is exhausted through the lower passage 49, the plunger 42 will be raised to effect engagement of the dog teeth 44 and prevent the bogie frame 17 from turning, or it will at least maintain pressure on the crests of the dog teeth 44 until they pass out of register sufficiently by continued turning movement of the bogie frame 17 to allow the plunger 42 to move upwardly and effect locking.

When the main undercarriage component is extended prior to landing, the bogie may be pitched with respect to the ground line within the limits shown at A—A in FIGURE 1 corresponding to the maximum tail-down attitude of the aircraft and at B—B corresponding to the maximum tail-up attitude of the aircraft. The rear pairs of wheels 23 and 24 are the first to engage the ground and the bogie then turns about the axis of the front pairs of wheels 21 and 22 under the restraint of the fully extended tie rod 29, but compressing the shock absorber between the telescoping leg parts 10 and 11. It will be seen that the axis of the king pin 16 is inclined to the ground line so that if the bogie has been turned out of the longitudinal direction by the jack 37 to allow for a cross-wind landing, the outermost rear wheel at one side or the other according to the steered direction of the bogie will touch ground before the outermost wheel on the opposite side. Although this applies an asymmetric load on the undercarriage component, this load will be comparatively light because the shock absorber between the leg parts 10 and 11 will be within the early stage of its compression. When the bogie has turned sufficiently so that the wheel axles are at the same height from the ground, the axis of the king pin 16 will be perpendicular to the ground irrespective of the angle through which the bogie has been turned whereby all the wheels will engage the ground substantially equally. This condition is arrived at during the early stage of compression of the shock absorber and continued compression of the shock absorber due to the weight of the aircraft, or any shock load in excess of this, results in further yielding of the shock absorber, together with telescoping movement of the tie rod 29. During such further compression when high shock absorber loads are likely to be sustained, the load on the leg member 10, 11 will be symmetrically applied.

When the aircraft undercarriage, including the nose-wheel, is running on the ground, the attitude of the main undercarriage may be that as shown with respect to the ground line C—C. If it is then desired to alter the drift angle of the main undercarriage component, either after landing or prior to take-off, the dog clutch 44 may be disengaged by the piston and cylinder device 51, 52 and the aircraft headed into the wind by the flying controls, so that the undercarriage can be steered or allowed to caster into the direction of the runway and subsequently locked by engagement of the dog clutch 44. During such steering or castering movement of the bogie, the main landing leg member 10, 11 may be inclined to the ground line C—C, but the axis of the king pin 16 will be vertical so that the distribution of load on the wheels is unaltered.

We claim as our invention:

1. A main undercarriage component for aircraft comprising a leg member adapted at its upper end for mounting on an aircraft, a rigid bogie having multiple wheel assemblies mounted on transverse rotational axes spaced one behind the other, an intermediate member by which the bogie is attached to the leg member, the intermediate member including a pivotal joint with the leg member having an axis transverse to the longitudinal direction of the aircraft and a pivotal joint with the bogie having an axis which perpendicularly intersects the plane containing the axes of the wheel assemblies at a position between said axes, and a steering motor interposed between the intermediate member and the bogie, said steering motor being operable to turn the bogie both ways from a longitudinal direction about its pivotal joint with the intermediate member.

2. A main undercarriage component according to claim 1, including a king pin fixed on the intermediate member forming the pivot on which the bogie is mounted, and including a turning lock comprising co-operable locking elements disposed on the king pin and on the bogie, one of said elements constituting a releasable locking element which is engageable with the other of said co-operable elements to secure the bogie in any one of a number of positions about the axis of the king pin.

3. A main undercarriage component according to claim 2, wherein the turning lock includes a plunger mounted in a key-way in the king pin for axial sliding movement in the latter without turning, a fluid actuated piston-and-cylinder device operatively interposed between the king pin and the plunger to effect reciprocal sliding movement of the plunger, and a dog clutch having teeth fixed on the bogie and movable teeth, constituting the releasable locking element, formed on the plunger for reciprocal movement therewith into and out of engagement with said fixed teeth.

4. A main undercarriage component for aircraft comprising a telescopic shock absorbing leg member adapted at its upper end for mounting on an aircraft, an intermediate member pivotally attached to the lower part of the leg member on an axis transverse to the longitudinal direction of the aircraft, a king pin fixed to the intermediate member perpendicular to said transverse axis, a bogie having multiple wheel assemblies mounted on rotational axes spaced one behind the other, the bogie being pivotally mounted on the king pin on an axis which perpendicularly intersects the plane containing the axes of the wheel assemblies at a position between said axes, a telescopic link pivotally connected between the bogie and one telescopic part of the leg member, said telescopic link being operative when extended to pitch the bogie about the transverse pivotal axis of the king pin member when the aircraft is in its landing attitude with the shock absorbing leg member extended, and a steering motor interposed between the intermediate member and the bogie, said steering motor being operable to turn the bogie both ways from a longitudinal direction about its pivotal joint with the intermediate member.

5. In combination with an aircraft undercarriage having an operatively upright leg member and a bogie member having at least a pair of wheel assemblies thereon arranged in tandem on rotational axes lying in a plane extending transverse to the longitudinal axis of the leg member, a swivel member movably interconnecting the leg and bogie members, said swivel member being pivotally connected with the leg member about a first axis extending parallel to said plane and pivotally connected with the bogie member about a second axis perpendicularly intersecting said plane intermediate the axes of said wheel assemblies, and motor means operative to pivot the bogie member about said second axis relative to the swivel member.

6. In combination with an aircraft undercarriage having an operatively upright leg member and a bogie member having at least a pair of wheel assemblies thereon arranged in tandem on rotational axes lying in a plane extending transverse to the longitudinal axis of the leg member, a pin member movably interconnecting the leg and bogie members, said pin member being pivotally connected with the leg member about a first axis extending parallel to said plane and pivotally connected with the bogie member about a second axis perpendicularly intersecting said plane intermediate the axes of the wheel assemblies, and means operative to releasably interlock the bogie member with the pin member so as to prevent pivotal movement therebetween.

7. The combination according to claim 6 wherein the pin member includes a king pin secured thereon about said second axis and said interlock means includes cooperable locking elements on the king pin and on the bogie member and means for releasably engaging the locking elements in any one of a number of relative positions of the bogie member about the pin member.

References Cited in the file of this patent

UNITED STATES PATENTS

| | | |
|---|---|---|
| 2,490,485 | Spaeth | Dec. 6, 1949 |
| 2,943,820 | Westcott | July 5, 1960 |

FOREIGN PATENTS

| | | |
|---|---|---|
| 915,565 | France | July 22, 1946 |
| 690,111 | Great Britain | Apr. 15, 1953 |